United States Patent [19]
Francis et al.

[11] 3,785,134
[45] Jan. 15, 1974

[54] MULTIPLE USE FINGER ASSEMBLY FOR A COMBINE HARVESTER

[75] Inventors: Robert L. Francis, East Moline; Paul L. Rouse, Moline, both of Ill.

[73] Assignee: International Harvester Compay, Chicago, Ill.

[22] Filed: Feb. 8, 1973

[21] Appl. No.: 330,768

[52] U.S. Cl. ............................................. 56/400
[51] Int. Cl. .......................................... A01d 77/00
[58] Field of Search .......................... 56/400, 221

[56] References Cited
UNITED STATES PATENTS
671,288   4/1901   MacPhail ........................... 56/400
3,045,414   7/1962   Scheidenhelm ................. 56/400 X FOREIGN PATENTS OR APPLICATIONS
1,038,816   9/1958   Germany .......................... 56/400

Primary Examiner—Louis S. Mancene
Assistant Examiner—J. N. Eskovitz
Attorney—Floyd B. Harman

[57] ABSTRACT

A finger assembly having various uses in connection with a combine harvester such as, for example, to provide grain pan fingers, beater grate fingers, or pick-up reel fingers. A channel member constitutes a base support for a multiplicity of fingers which are capable of quick and easy manual removal and installation in various relief areas which are provided in the channel flanges and web.

5 Claims, 7 Drawing Figures

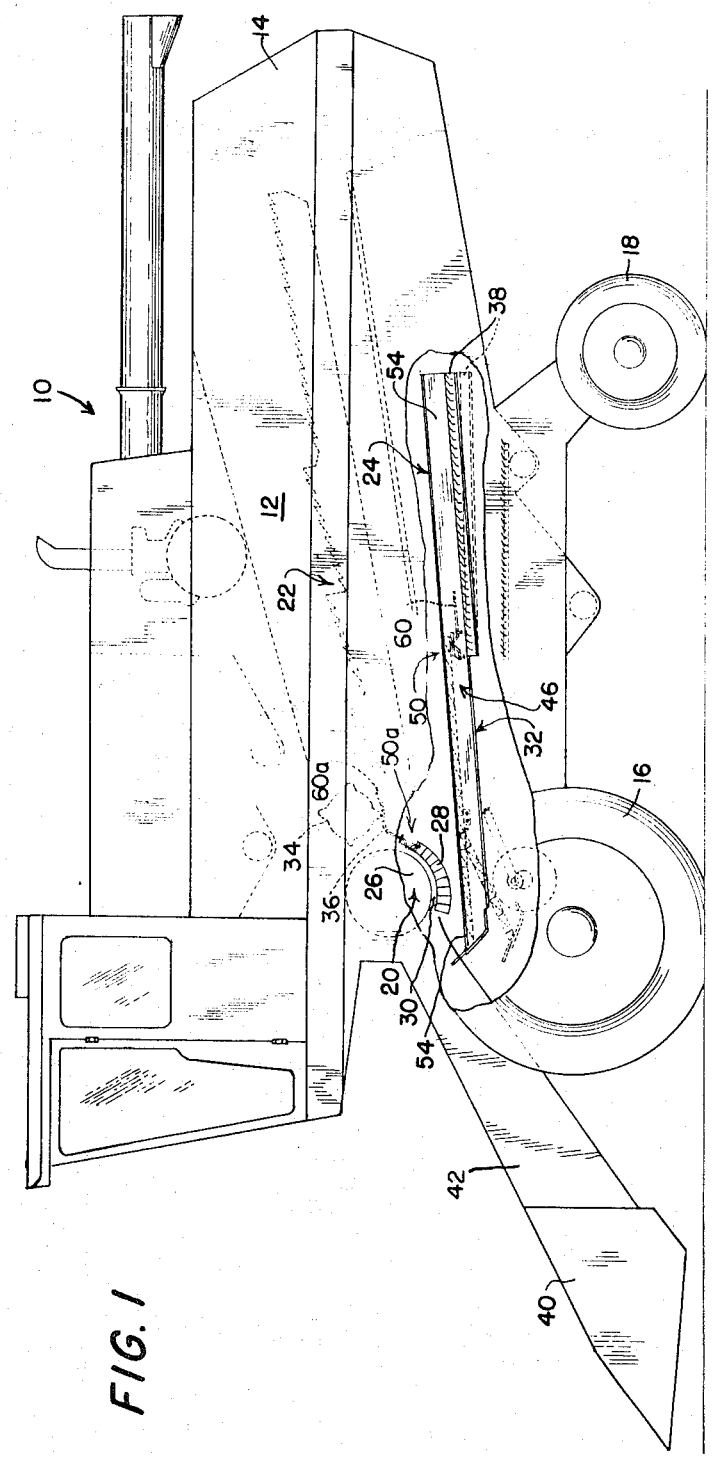

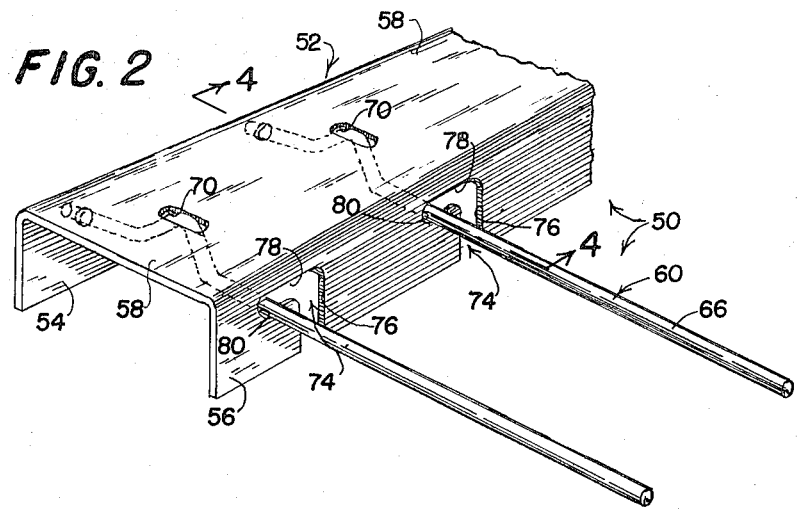
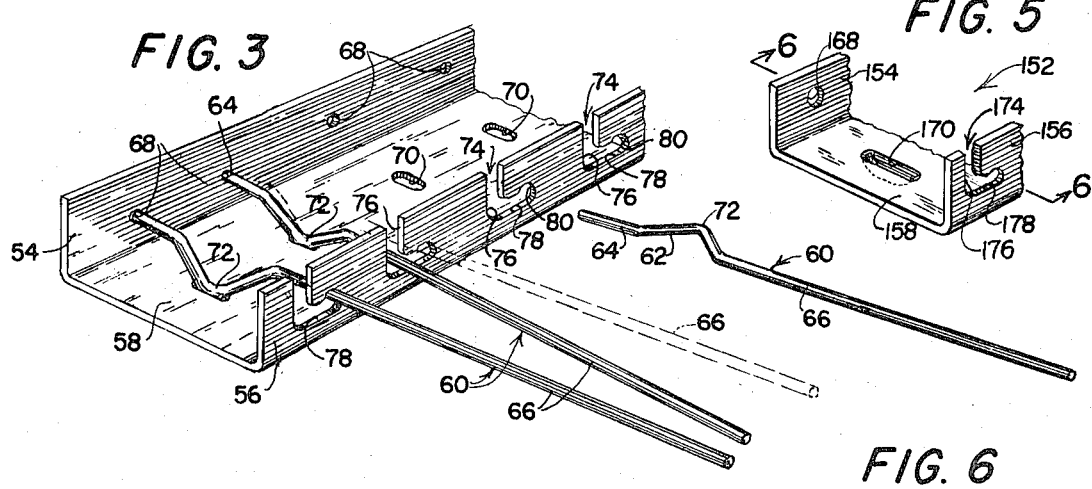
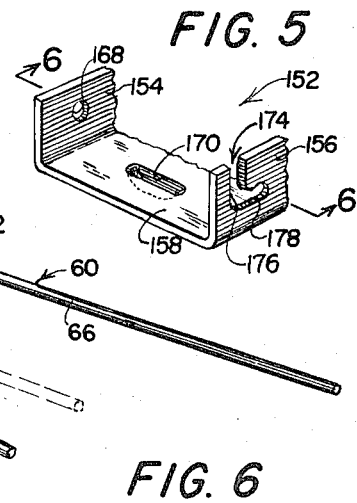
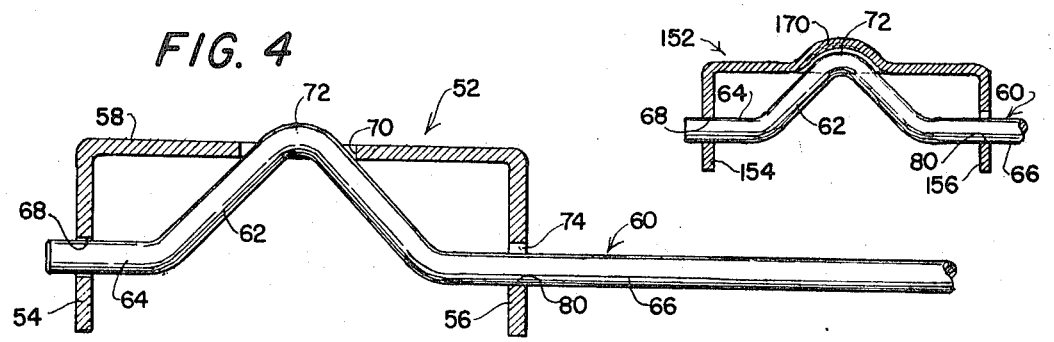
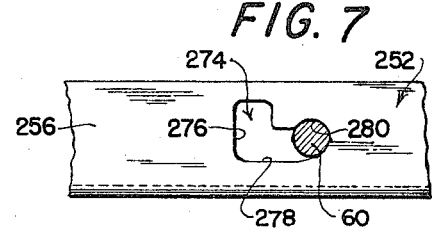

MULTIPLE USE FINGER ASSEMBLY FOR A COMBINE HARVESTER

The improved finger assembly comprising the present invention has been designed for use primarily in connection with a combine harvester wherein it may find various uses. Among such uses are the provision of a series of rotary material-impelling fingers such as are commonly employed in connection with pick-up reels, relatively fixed grain pan fingers which are fixedly supported on but movable bodily with an oscillatable grain pan, and stationary fingers such as are used in the formation of a combined beater grate. The invention is however capable of other uses and, if desired, the same may be employed, with or without modification as required, in providing similar series of fingers or tines, whether movable or stationary, in connection with a wide variety of other agricultural machines such as hay rakes or the like where such fingers perform similar material impelling, agitating or sifting functions. Irrespective however of the particular use to which the invention may be put, the essential features thereof are at all times preserved.

Heretofore, certain finger assemblies of the type under consideration, and designed for the same purposes, have embodied base members to which the associated fingers are permanently attached, such assemblies possessing the obvious disadvantage that individual finger replacement is not possible. Thus, as the various fingers become worn, damaged or broken, the efficiency of the machine to which the assembly is applied is decreased accordingly and, ultimately, replacement of the entire assembly is necessary. Other finger assemblies which are intended to obviate this difficulty have been provided with replaceable fingers but these have presented other difficulties, one of which resides in the fact that special tools are required to effect finger substitution and replacement. A further limitation which is present in connection with assemblies of this character arises from the fact that the fastening means which is employed for the individual fingers or tines embodies extraneous devices such as special spring clips and the like which, themselves, must be installed on the base member before the fingers can be applied. Such fastening devices sometimes are not as strong or as rigid as the fingers which they are intended to fasten in place and, as a result, loss of fingers, together with their associated fastening means frequently takes place. Furthermore, the use of extraneous fastening devices requires a large inventory of spare parts.

Recently, certain snap-in types of fingers have appeared on the market but these also have limitations in that they are necessarily associated only with fingers or tines which are relatively flexible and possess spring characteristics which are not conducive toward finger stability. Just as such fingers are capable of being manually snapped into position, so also are they capable of being dislodged from their installed positions under the influence of impact with objects such as stones or the like whereby they are snapped out of position and consequently lost.

The present invention is designed to overcome the above noted limitations that are attendant upon the construction and use of present day finger assemblies and, toward this end, the invention contemplates the provision of such an assembly of the snap-in finger type wherein, whether the fingers be relatively rigid or flexible, they are rigidly held in position against dislodgment in the base member which supports them.

In carrying out the invention, there is provided a base member of channel shape design whice presents a pair of side flanges and an interconnecting channel web. The various fingers extend in spaced parallelism transversely of the base channel with their inner or proximate end regions anchored within the channel confines and with their distal end regions projecting laterally outwardly of the channel. In order to anchor the inner end region of each finger within the channel, a V-bend is provided in such region and the extreme inner end of the finger projects through a hole in one of the channel flanges while the apex region of crest of the V-notch projects into and seats within a transverse slot or relief area in the channel web. The finger projects through a bayonet slot in the other channel flange and the entire inner end region exists under a considerable degree of flexion where it is confined by the three anchor regions which are established by the aforementioned hole, relief area and bayonet slot. Installation of a given finger within the channel is accomplished by the simple expedient of merely thrusting the inner end of the finger through the hole in one channel flange, causing the V-bend to seat in the relief area of the web, flexing the finger into the bayonet slot, and releasing the flexing pressure so that the finger snaps into a locked position within the bayonet slot. Removal of the finger is accomplished by a reversal of the procedure. The channel web and one of the channel flanges are provided with attachment holes whereby the base member may be operatively bolted or otherwise secured to the rear edge of a concave, the framework of a grain pan, the peripheral squirrel cage bar of a pick-up reel, or other harvester combine instrumentality on which the finger assembly is to be installed. By such an arrangement, finger removal and replacement operations in the field may be carried out manually without the aid of tools. The provision of a finger assembly such as has briefly been outlined above constitutes the principal object of the present invention.

The provision of a finger assembly which is extremely simple in its construction and which therefore may be manufactured at a low cost; one in which the base support for the fingers proper may be fashioned from heavy guage sheet material by a simple stamping operation and in which the fingers themselves may be fashioned by conventional rod or wire shaping apparatus, thereby further contributing to economy of manufacture; one which is comprised of a minimum number of parts and which therefore is unlikely to get out of order; one which is rugged and durable and which therefore will withstand rough usage; and one which, otherwise, is well adapted to perform the services required of it, are further desirable features which have been borne in mind in the production and development of the present invention.

Other objects and advantages of the invention, not at this time enumerated, will become readily apparent as the nature of the invention is better understood.

In the accompanying two sheets of drawings forming a part of this specification, two illustrative embodiments of the invention have been shown.

In these drawings:

FIG. 1 is a side elevational view, largely schematic in its representation, of a combine harvester embodying a plurality of the finger assemblies of the present invention, the assemblies being put to varying uses;

FIG. 2 is an enlarged fragmentary top perspective view of one end region of the finger-supporting base member of channel and showing the two endmost fingers operatively installed therein;

FIG. 3 is an enlarged fragmentary bottom perspective view of the other end region of the base channel with the endmost fingers operatively installed therein;

FIG. 4 is a further enlarged sectional view taken substantially on the vertical plane indicated by the line 4—4 of FIG. 2 and in the direction of the arrows;

FIG. 5 is a fragmentary perspective view, similar to FIG. 3, showing a slightly modified form of base channel;

FIG. 6 is a sectional view taken substantially on the vertical plane indicated by the line 6—6 of FIG. 5; and FIG. 7 is a fragmentary side elevational view of another modified base channel which is capable of use in connection with the invention.

Referring now to the drawings in detail and in particular to FIG. 1, a combine harvester embodying the present invention is designated in its entirety by the reference numeral 10, the harvester being of more or less conventional construction except for the provision of a plurality of the novel finger assemblies of the present invention and which are put to varying uses in performing varying machine functions as will be described subsequently. The combine harvester 10 involves in its general organization a chassis or body portion 12 having vertical side walls 14, the body portion being tractionally supported by drive wheels 16 and steerable wheels 18. The body portion 12 serves to enclose the grain threshing mechanism 20, the separating mechanism 22 and the cleaning mechanism 24, the finger assembly of the present invention being operatively associated with each of these three mechanisms in a manner and for purposes that will be made clear presently.

The grain threshing mechanism 20 includes a threshing drum or cylinder 26 which is mounted for rotation about a transverse axis of the harvester and cooperates with a concave 28 in the usual manner to define a threshing zone 30 therebetween. A grain pan assembly 32 is disposed below the concave 28 and functions to collect the grain and chaff which passes through the concave and convey it rearwardly toward the cleaning mechanism 24. A rotary beater cylinder 34 is located rearwardly of the threshing drum 26, together with a cooperating beater grate 36 which is supported at the rear end of the concave 28. Threshed grain and straw is swept by the beater cylinder over the grate and an appreciable amount of grain is separated from the straw at this region, such grain falling through the grate 36 and onto the grain pan 32. The beater grate embodies a series of parallel, closely spaced fingers by means of which the grain is given a longer period of separation. The cleaning mechanism 24 further includes a chaffer sieve 38 which is supported from the grain pan assembly. Material such as straw or the like which does not pass through the concave 28 is discharged by the threshing drum to the separating mechanism 22 which removes any remaining grain and deposits it on the cleaning mechanism, while at the same time discharging the remaining straw to the ground out of the rear of the harvester.

The harvester is fed with unthreshed material which is collected by the crop supply platform 40. This material travels upwardly and rearwardly through the feeder 42 under the influence of an internal conveyor (not shown), the conveyor discharging its contents rearwardly over the rear edge of the feeder and into the threshing zone.

The general arrangement of parts thus far described is purely conventional and no claim is made herein to any novelty associated with the same, the novelty of the present invention residing rather in the association with the harvester of one or more finger assemblies or units such as have individually been designated in their entirety at 50 and 50a in FIG. 1 and which are capable of use with only slight modification in connection with either the aforementioned grain threshing or cleaning mechanisms, all in a manner that will be described in detail presently. Similar finger assemblies can also be used for the chaffer fingers, shoe fingers or the pick-up reel fingers of a combine.

It has long been the practice in connection with a combine harvester to provide a series of spaced apart parallel so-called grain pan fingers at the discharge edge of the grain pan, such fingers overlying the adjacent front edge of the chaffer sieve in slightly spaced relationship. These fingers are provided for the purpose of preventing occasional stray pieces of straw from falling directly on the chaffer sieve and clogging the sieve openings. The present invention comtemplates that one or more of the finger assemblies shall replace various conventional combine finger assemblies. Accordingly, in FIG. 1, a finger assembly 50 is shown as being disposed in the cleaning area of the harvester 10 and another finger assembly 50a as being operatively mounted on the discharge end of the concave 28.

The details of the finger assembly 50 are clearly shown in FIGS. 2 to 4 inclusive the assembly being comprised of a base member or channel 52 having side flanges 54 and 56 and a connecting channel web 58, together with a multiplicity of fingers proper 60. The proximate or inner end regions of the various fingers 60 are disposed within the confines of the channel 52 while the outer or distal regions of the fingers project laterally from the channel flange 56. The base member or channel 52 is adapted to be fixedly secured in an inverted position between the opposed parallel side rails of the grain pan assembly, only one such side rail being shown in FIG. 1. With the channel 52 thus properly installed on the grain pan assembly, the various fingers project rearwardly over the chaffer sieve in the manner of conventional grain pan fingers.

The various fingers 60 are identical in construction and, as best shown in FIG. 4, and can be the same or of varying lengths. A limited end region of each finger is disposed within the confines of the channel 52, the remaining portion thereof projecting laterally of the channel and being disposed exteriorly of the latter. For descriptive purposes the end of the finger in the vicinity of the channel 52 will be referred to as the inner or proximate end while the end which is remote from the channel will be referred to as the outer or distal end.

The proximate end region of each finger is formed with a laterally offset V-bend 62, such bend being spaced a slight distance from the inner end of the rod, thus leaving a short straight section 64 at the extreme inner end thereof. A relatively long section 66 of the rod on the side of the V-bend opposite the section 64 is linearly straight and can be coaxial with the section 64, however it is not necessary that these sections are coxial.

In order to accommodate the proximate end region of the finger 60 in substantially rigid finger-supporting relationship, the side flange 54 is provided with an anchor hole 68 which receives the finger section 64 endwise. The channel web 58 is formed with a transverse slot 70 which receives the apex region 72 of the V-bend 62. The side flange 56 is provided with a bayonet slot 74 through which the section 66 of the finger 60 projects, and with which the section 66 is adapted to make latching engagement.

Considering the channel 52 in the inverted position in which it is shown in FIG. 2, each bayonet slot 74 affords a relatively narrow lower vertical entrance mouth 76 which opens onto the adjacent free edge of the side flange 56 and communicates with a lateral horizontal transfer area 78 which in turn communicates with a short vertical locking area 80. When the proximate end region of the finger 60 is operatively installed in the channel 52, it exists under an appreciable degree of flexion with the finger section 66 bearing downwardly against the lower side of the hole 68, the apex region 72 of the V-bend 62 bearing upwardly against the ends of the slot 70, and the finger section 66 bearing downwardly against the bottom of the locking area 80 of the bayonet slot 74. It will be understood of course that the various anchor holes 68 are arranged in a longitudinal row in the side flange 54 that the slots 70 are similarly arranged in a row in the channel web 58, and that the bayonet slots 74 are arranged in a row in the side flange 56. It will also be understood that each anchor hole 68 and its associated transverse slot 70 and bayonet slot 74 are disposed in a common vertical transverse plane. Thus, with all of the fingers 60 operatively installed in their associated relief areas 68, 70 and 74, it will be apparent that the various fingers 50 will extend in parallelism.

Inasmuch as the finger assembly 50 is installed on the grain pan 32 with the channel 52 in an inverted position (FIG. 2), if it is desired to remove an existing installed grain pan finger from the channel preparatory to replacing the same with a new finger, the operator will lift the laterally projecting portion 66 from its seating engagement with the lower edge of the locking area 80 of the bayonet slot 74 and thus move the portion 66 into register with the transfer section 78. Thereafter, the portion 66 may be shifted sidewise and into register with the bayonet slot mouth 76, thereby freeing the confined portion of the finger 60 so that the projecting portion 66 thereof may be freely moved downwardly to withdraw the crest or apex 72 of the V-bend 62 from the slot 70. Thereafter the rod or finger may be pulled endwise from the hole 68. Replacement of a new finger within the channel 52 is accomplished by a reversal of the procedure.

In order to adapt the channel 52 to varying installations, a series of bolt holes (not shown) may be formed in the side flange 56 (or) web 58, as required, for the selective reception of clamping bolts by means of which the channel may be secured to such frame pieces as may be provided for supporting the channel in the required position.

As previously stated, the above described finger assembly of the present invention is not necessarily limited to use in connection with the provision of grain pan fingers. The assembly 50a, with but slight modification, is capable of being used at the rear end of the harvester concave 28 to establish a beater grate such as the aforementioned grate 36 (FIG. 1). When used for this purpose, no modifications whatsoever of the base channel 52 is required and the latter may be affixed to the rear end of the concave by the use of suitable clamping bolts, thus maintaining the channel in a position wherein the fingers which are associated therewith will underlie the beater cylinder 34. Accordingly, as shown in FIG. 1, a finger assembly 50a is shown as being affixed to the rear end of the concave 28, such assembly embodying one of the previously described channels 52, together with a series of modified fingers 60a in which the proximate channel-confined end regions thereof are identical with the corresponding proximate end regions of the fingers 50, but in which the outer projecting portions thereof are arcuate in contour and conform to the arcuate shape of conventional beater grate fingers. It should be noted that the arcuate contour of fingers 60a is intended only as an example and that the outer end of the fingers can be of any desired shape.

The finger assembly 50 is also capable of other combine harvester uses which have not been illustrated herein. One such use is in connection with a rotary harvester reel where a channel 52 may be installed so that the fingers 60 associated therewith function as pickup fingers in the usual manner.

In FIGS. 5 and 6 a slightly modified form of channel 152 which is capable of substitution for the channel 52 is disclosed. This channel 152 is capable of use with either the fingers 60 or 60a and it cooperates to anchor such fingers in substantially the same manner as does the channel 52. The only difference between the channel 52 and the channel 152 resides in the fact that, instead of cutting the slots 70 completely through the web portion 58 of the channel, shallow and generally elliptical sockets 170 are formed in the web portion 158, these sockets serving as seating depressions for the apex regions 72 of the V-bends 62 of the associated fingers or tines 60. In view of the similarity between the previously described channel 52 and the modified form of channel 152, and in order to avoid needless repetition of description, similar reference numerals but of a higher order have been applied to the corresponding parts as between the disclosures of FIGS. 3 and 4 on the one hand and FIGS. 5 and 6 on the other.

In FIG. 7 another modified form of channel 252 is illustrated in which each bayonet slot 272 in the side flange 256 of the channel is in the form of a self-contained opening which is disposed wholly within such side flange so that the entrance mouth 272 does not open onto the free edge of the side flange. Again, in order to avoid repetition of description, similar reference numerals but of a still higher order have been applied to the corresponding parts as between the disclosures of FIGS. 3 and 7. When bayonet slots such as the slot 274 are employed, the finger is locked to and released from the channel 252 in substantially the same manner as has previously been described in connection with the channel 52 but access to the interior of the channel for installation or removal purposes is accomplished by causing the finger 260 to be projected endwise into or withdrawn endwise from (as the case may be) the bayonet slot.

The invention is not to be limited to the exact arrangement of parts shown in the accompanying drawings or described in this specification as various changes in the details of construction may be resorted to without departing from the spirit of the invention, therefore, only insofar as the invention has particularly been pointed out in the accompanying claims is the same to be limited.

What is claimed is:

1. For use in connection with a harvesting machine, a finger assembly comprising in combination a base supporting channel presenting a pair of side flanges, and a connecting web portion, a plurality of laterally spaced parallel elongated fingers formed of rod stock and having their inner proximate end regions removably disposed within the confines of said channel and having their remaining outer distal portions projecting laterally outwardly of the channel, said side flanges and web portion of the channel being provided with a plural series of relief areas therein, there being one series for each finger with the various series being disposed in longitudinally spaced regions along the channel, the proximate end region of each finger consisting of two coaxial substantially linearly straight rod sections and an intermediate laterally offset portion, one of said straight rod sections projecting into a relief area in one of said side flanges, the laterally offset portion projecting into a relief area in said web portion, and the other straight rod section projecting through a relief area in the other side flange in latching engagement therewith, said proximate end region of the finger existing under an appreciable degree of flexion and making binding engagement with its associated relief area and wherein the relief area in said one side flange is in the form of a hole through which one straight rod section projects, and the relief area in the other side flange is in the form of a bayonet slot having an entrance mouth, a lateral transfer area and a locking area for reception of said other straight rod section.;

2. A finger assembly as set forth in claim 1, wherein said entrance mouth of the bayonet slot opens onto the free edge of said other side flange of the channel.

3. A finger assembly as set forth in claim 1, wherein the relief area in said web portion of the channel is in the form of an elongated transversely extending slot into which said laterally offset portion of the finger projects and between the edges of which it is confined.

4. A finger assembly as set forth in claim 3, wherein said laterally offset portion of the finger is in the form of a V-bend which has its apex region projecting into said transversely extending slot in the web portion of the channel.

5. A finger assembly as set forth in claim 5, wherein said base channel is rectilinear in transverse cross section and said side flanges and web portion are planar and extend at right angles to said web portion.

* * * * *